United States Patent
Sugarbaker

(10) Patent No.: US 11,706,240 B2
(45) Date of Patent: *Jul. 18, 2023

(54) NETWORK RESOURCE IMPLEMENTATION PRIORITIZATION

(71) Applicant: Cisco Technology, Inc., San Jose, CA (US)

(72) Inventor: Travis Sugarbaker, Seattle, WA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 324 days.

This patent is subject to a terminal disclaimer.

(21) Appl. No.: 17/068,383

(22) Filed: Oct. 12, 2020

(65) Prior Publication Data

US 2021/0044613 A1 Feb. 11, 2021

Related U.S. Application Data

(63) Continuation of application No. 15/941,102, filed on Mar. 30, 2018, now Pat. No. 10,862,917.

(60) Provisional application No. 62/488,242, filed on Apr. 21, 2017.

(51) Int. Cl.
*H04L 29/06* (2006.01)
*H04L 9/40* (2022.01)
*H04L 43/08* (2022.01)

(52) U.S. Cl.
CPC .......... *H04L 63/1433* (2013.01); *H04L 43/08* (2013.01); *H04L 63/205* (2013.01)

(58) Field of Classification Search
CPC .... H04L 63/1433; H04L 63/205; H04L 43/08
See application file for complete search history.

(56) References Cited

U.S. PATENT DOCUMENTS

| | | | |
|---|---|---|---|
| 6,952,779 B1 | 10/2005 | Cohen et al. | |
| 7,013,395 B1 | 3/2006 | Swiler et al. | |
| 8,918,883 B1 | 12/2014 | Boyle et al. | |
| 9,692,778 B1 | 6/2017 | Mohanty | |
| 10,044,745 B1 * | 8/2018 | Jones | G06F 21/55 |
| 2009/0077666 A1 | 3/2009 | Chen et al. | |
| 2012/0304300 A1 | 11/2012 | LaBumbard | |
| 2016/0232358 A1 | 8/2016 | Grieco et al. | |
| 2017/0026343 A1 * | 1/2017 | Wardman | H04L 63/0421 |

(Continued)

*Primary Examiner* — Tri M Tran
(74) *Attorney, Agent, or Firm* — Edell, Shapiro & Finnan, LLC

(57) ABSTRACT

Techniques for providing dynamic resource implementation prioritization for a network are provided. In one embodiment, a method includes determining a user of a selected device and assigning a user value based on the user's identity. The method includes determining related devices on the network by evaluating user behavior information to identify devices in the network that are in communication with the selected device. The method includes calculating a composite device value based on a value of the selected device, the user value, and values of the related devices. The method includes determining a probability factor for potential security vulnerabilities affecting the selected device and calculating a risk score based on the composite device value and the probability factor. Security measures may be implemented based on a comparison of the calculated risk score for the selected device with a plurality of risk scores for other devices in the network.

20 Claims, 13 Drawing Sheets

(56) References Cited

U.S. PATENT DOCUMENTS

2017/0230418 A1\* 8/2017 Amar ................. H04L 67/01
2018/0091540 A1 3/2018 Solow et al.

\* cited by examiner

NETWORK RESOURCE IMPLEMENTATION PRIORITIZATION

CROSS-REFERENCE TO RELATED APPLICATION

This application is a continuation of U.S. application Ser. No. 15/941,102, entitled "NETWORK RESOURCE IMPLEMENTATION PRIORITIZATION," filed Mar. 30, 2018, which claims the benefit of priority under 35 U.S.C. § 119 to U.S. Provisional Patent Application Ser. No. 62/488,242, entitled "VULNERABILITY PRIORITIZATION THROUGH USER AND NETWORK RISK CONTEXT TRANSFERENCE", filed on Apr. 21, 2017. The entire contents of both of these applications are hereby incorporated by reference in entirety.

TECHNICAL FIELD

The present disclosure relates to network and computer security.

BACKGROUND

Vulnerability management is a field that has seen little innovation over the last several decades and operates on relatively old scanning principles, primarily driven by risk and compliance regulations. The entire vulnerability management lifecycle (detection, assessment, reporting, remediation, validation) suffers from a lack of prioritization, context, and analytics. Prioritization is frequently based on a security professional's tacit knowledge combined with context-less vulnerability metadata (e.g., Common Vulnerability Scoring System (CVSS) score). The result is a complex, time-consuming, error-prone, difficult, and very manual process to review and prioritize vulnerabilities detected in an environment. This in turn increases customer costs, increases time to remediate, and ultimately increases security risk for customers.

DESCRIPTION OF EXAMPLE EMBODIMENTS

Overview

Figure 1:
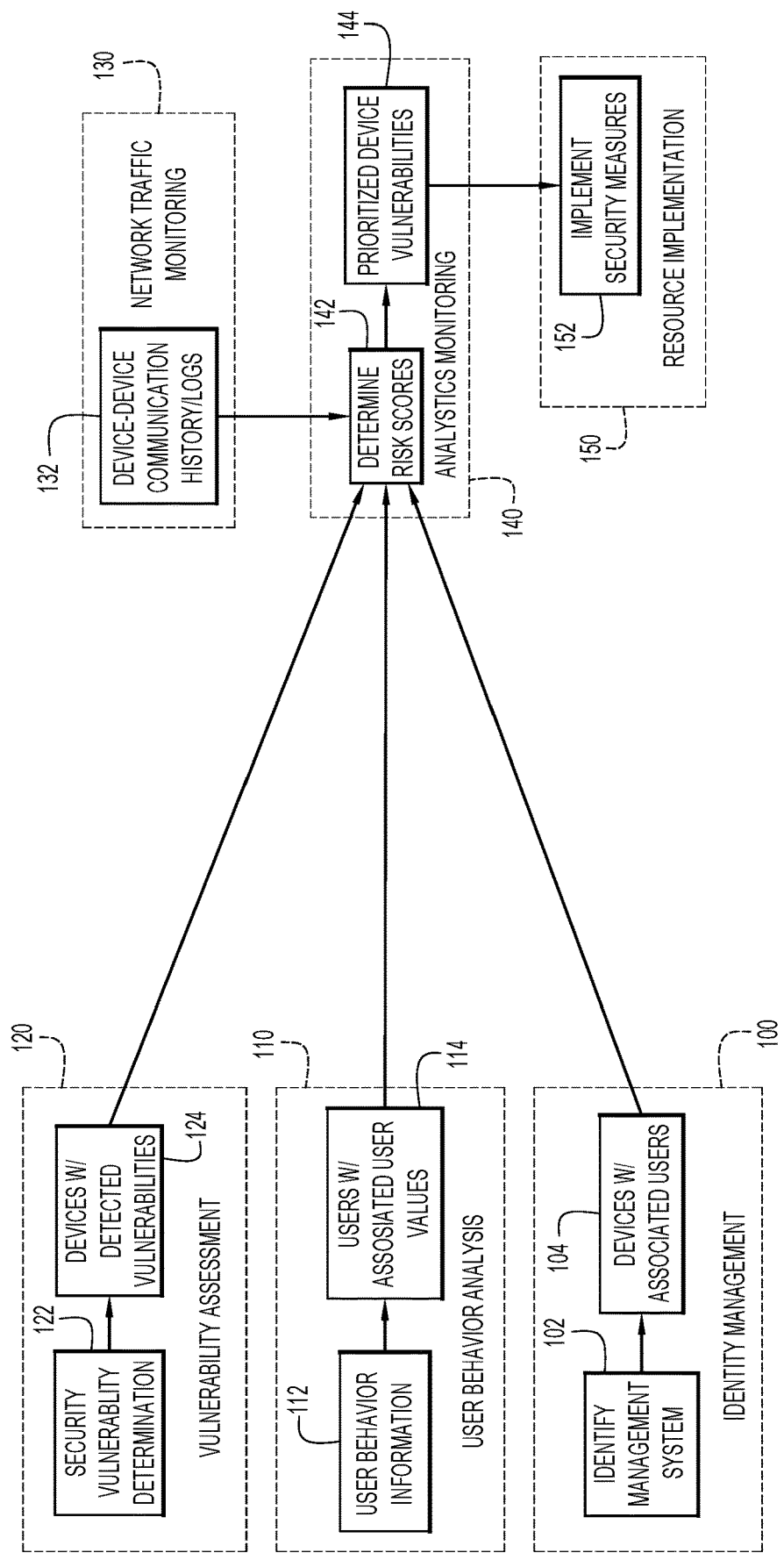
FIG. 1 is a block diagram of the logical/functional components of a resource implementation prioritization system for a network, according to an example embodiment.

Presented herein are techniques for providing dynamic resource implementation prioritization for a network. In an example embodiment, a computer-implemented method is provided that includes determining, for a selected device in a network, at least one user of the selected device. The method also includes assigning a user value to the at least one user. The user value is based on an identity of the at least one user. The method includes determining one or more related devices on the network associated with the at least one user by evaluating behavior information of the at least one user to identify devices in the network that are in communication with the selected device. The method further includes calculating a composite device value for the selected device based on: (i) a value of the selected device, (ii) the user value, and (iii) values of the one or more related devices. The method includes determining a probability factor associated with potential security vulnerabilities affecting the selected device and calculating a risk score for the selected device based on the composite device value and the probability factor. The method further includes implementing security measures in the network based on a comparison of the calculated risk score for the selected device with a plurality of risk scores for other devices in the network.

Example Embodiments

Presented herein are techniques for providing dynamic resource implementation prioritization for a computer network. Dynamic resource implementation may include implementing a variety of preventative and/or reactive security measures in a network using a risk-based prioritized assessment of vulnerabilities in the network. A user device's relationship to other related devices on the network is extracted from user behavioral analytics and network traffic monitoring systems and propagated onto the related devices (e.g., network endpoints) with which the user and the user's device interacts. Network endpoints further propagate relationships to other network endpoints that interact with each other and other users. A composite value for a device is calculated based on the value of the user, the user's device, and the values of the related devices. A probability factor associated with a likelihood of a given vulnerability (e.g., a computer security vulnerability) affecting the device is determined based on an exploit probability of the device, as well as the exploit probabilities of the related devices. Together, the composite value and the probability factor are used to determine a risk score for a device.

Detected vulnerabilities may be prioritized using the innate vulnerability severity/risk (e.g. CVSS score and other properties) combined with the device's risk score that was derived using the above described method. This ultimately produces a vulnerability priority that more accurately reflects the true risk of vulnerabilities in the network. With this arrangement, a network monitoring system, such as an analytics system, may determine appropriate dynamic resource implementation prioritization for the network to allow high-risk vulnerabilities (e.g., those having a higher risk score value) to take precedence over low-risk vulnerabilities (e.g., those having a lower risk score value).

The principles of the embodiments described herein provide a more accurate way to assess the business risk of a vulnerability by combining user behavior-derived user risk score with network traffic flow data (e.g., derived from Cisco Systems' Stealthwatch™ records, as one example) to intelligently, automatically, and easily transfer that user risk onto a vulnerability instance for improved prioritization for resource implementation in the network.

FIG. 1 illustrates a logical/functional diagram of a system for providing dynamic resource implementation prioritization in a computer network according to an example embodiment. The system includes identity management functions 100 that may be provided by an identify management system 102 that outputs a list of devices with associated users 104. The system also includes user behavior analysis functions 110 that may evaluate user behavior information 112 to output a list of users and their associated user values 114. The system includes vulnerability assessment functions 120 that may provide a security vulnerability determination 122 that output a list of devices with detected vulnerabilities 124. Also included in the system are network traffic monitoring functions 130 that provides device-to-device communication history/logs 132. All of these outputs may be used by analytics monitoring functions 140 that determine risk scores 142 for devices in the network and outputs a prioritized list of device vulnerabilities 144. The prioritized list of device vulnerabilities 144 may be used by resource implementation functions 150 to take action based on the severity of the vulnerability, for example, to implement security measures 152, as described in more detail below.

Figure 2:
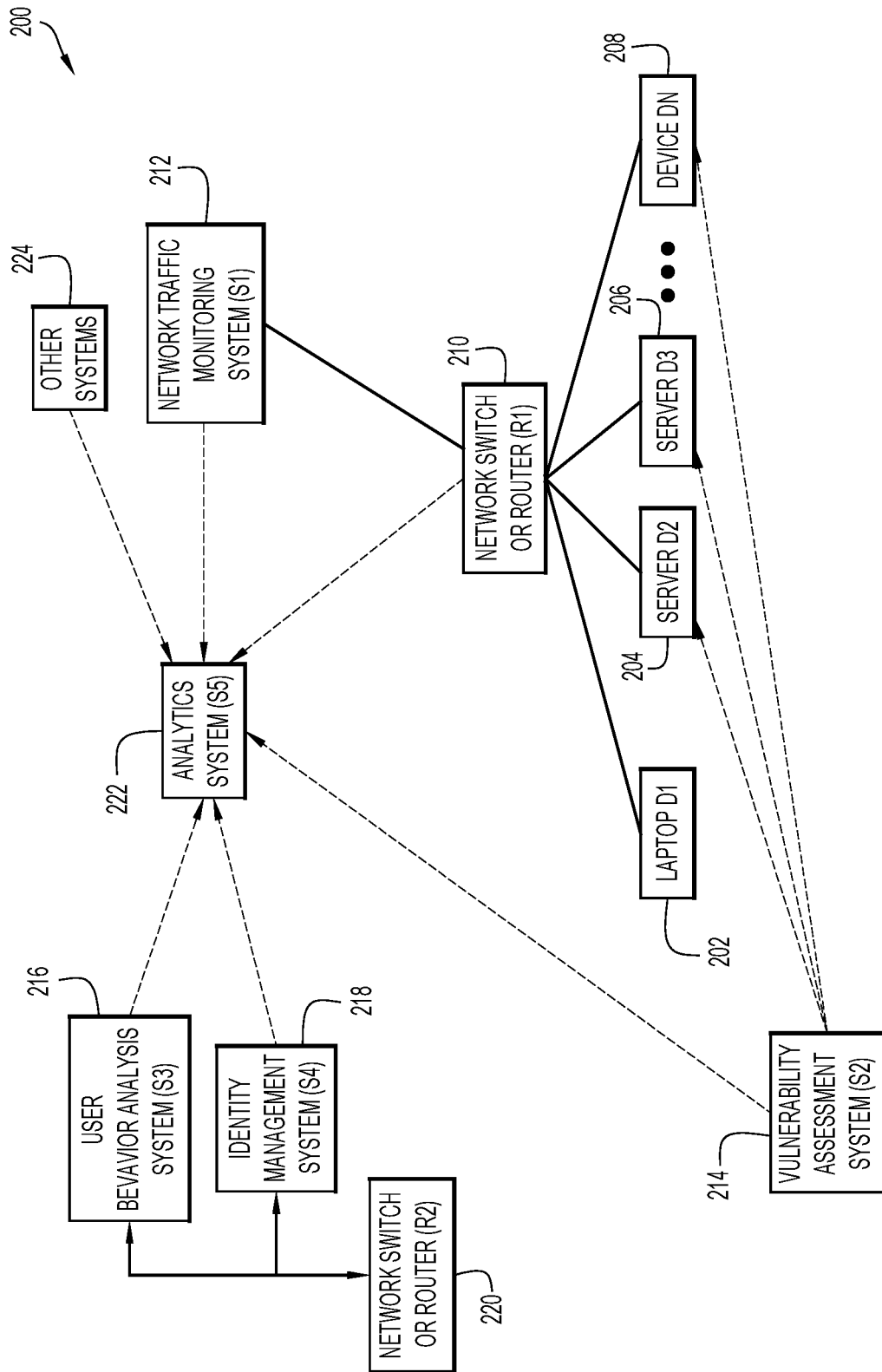
FIG. 2 is a block diagram of the physical components of the resource implementation prioritization system for a network, according to an example embodiment.

FIG. 2 illustrates a diagram that depicts physical components of the system for providing dynamic resource implementation prioritization in a computer network 200 according to an example embodiment. In this embodiment, network 200 includes, as example user devices, a laptop (D1) 202, a first server (D2) 204, a second server (D3) 206, and may further include one or more additional devices represented by nth device (Dn) 208. Network 200 may include additional components, for example, a first network switch or router (R1) 210 in communication with user devices 202, 204, 206, 208, and a second network switch or router (R2) 220. Additional system components of associated with network 200 include a network traffic monitoring system (S1) 212, a vulnerability assessment system (S2) 214, a user behavior analysis system (S3) 216, an identity management system (S4) 218, and an analytics system (S5) 222.

In an example embodiment, each of systems 212, 214, 216, 218, as well as other systems 224, outputs data to analytics system 222 that is used to determine dynamic resource implementation prioritization. Network traffic monitoring system 212 is configured to provide network traffic flow data, such as device communication history and logs, application data, and traffic routing, to analytics system 222. For example, network traffic monitoring system 212 may be any number of products or systems including Cisco Systems' Stealthwatch, and may use Cisco Systems' NetFlow, Internet Protocol Flow Information Export (IPFIX) protocol, or other known traffic monitoring techniques to collect traffic flow data for network 200. The vulnerability assessment system 214 is configured to perform vulnerability scans on user devices 202, 204, 206, 208 to provide vulnerability information to analytics system 222. For example, vulnerability assessment system 214 may include an intrusion prevention system (IPS) and/or one or more vulnerability assessment tools such as Nmap, ISIC, Nessus and other known products.

User behavior analysis system 216 and identity management system 218 are configured to identify users of devices 202, 204, 206, 208 on network 200 and collect behavior information associated with users to provide user information and related device information to analytics system 222. This information may be used by analytics system 222, for example, to determine user values, device values, and/or values of related devices, as described in more detail below. One or more functions of user behavior analysis system 216 and identity management system 218 may be provided by any number of products or systems including Cisco Systems' Identity Services Engine, or various other user/entity analytics products or services. In addition, in some embodiments, multiple functions may be provided by a single system.

Figure 3:
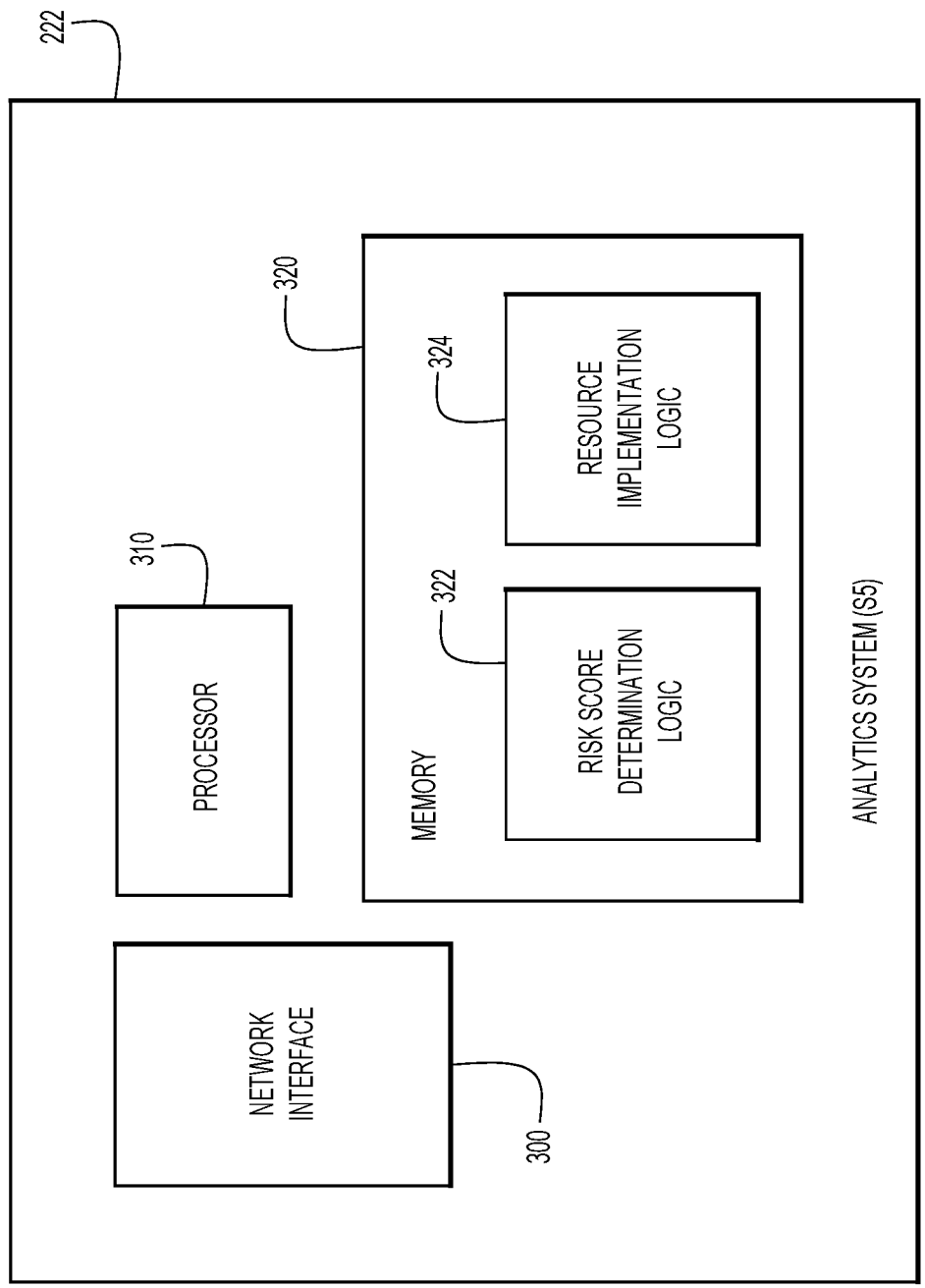
FIG. 3 is a block diagram of a computer or server on which analytics system software runs as part of the resource implementation prioritization system, according to an example embodiment.

FIG. 3 illustrates an example embodiment of an apparatus of analytics system 222 upon which the embodiments presented may be implemented. Analytics system 222 may be embodied by software running on a computer or server system that includes a network interface 300 in order to enable network communications with other systems 212, 214, 216, 218, 224 of network 200 shown in FIG. 2. The network interface 300 may be, for example, one or more network interface cards configured to enable network communications. Analytics system 222 also includes a processor 310 for processing information and may further include a bus (not shown) or other communication mechanism coupled with processor 310 for communicating the information. While the figure shows a single block 310 for a processor, it should be understood that the processor 310 may represent a plurality of processing cores, each of which can perform separate processing.

Analytics system 222 may also include a memory 320, such as a random access memory (RAM) or other dynamic storage device (e.g., dynamic RAM (DRAM), static RAM (SRAM), and synchronous DRAM (SD RAM)), coupled to the bus for storing information and instructions to be executed by processor 310. For example, risk score determination logic 322 and/or resource implantation logic 324 is stored in memory 320 for providing one or more of the functions of analytics system 222 described herein. In addition, memory 320 may be used for storing temporary variables or other intermediate information during the execution of instructions by processor 310.

Analytics system 222 may further include other components not explicitly shown or described in the example embodiments. For example, analytics system 222 may include a read only memory (ROM) or other static storage device (e.g., programmable ROM (PROM), erasable PROM (EPROM), and electrically erasable PROM (EEPROM)) coupled to the bus for storing static information and instructions for processor 310. Analytics system 222 may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to analytics system 222 using an appropriate device interface (e.g., small computer system interface (SCSI), integrated device electronics (IDE), enhanced-IDE (E-IDE), direct memory access (DMA), or ultra-DMA).

Analytics system 222 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

Analytics system 222 performs a portion or all of the processing steps of the process in response to processor 310 executing one or more sequences of one or more instructions contained in a memory, such as memory 320. Such instructions may be read into memory 320 from another computer readable medium, such as a hard disk or a removable media drive. One or more processors in a multi-processing arrangement may also be employed to execute the sequences of instructions contained in memory 320. In alternative embodiments, hard-wired circuitry may be used in place of or in combination with software instructions. Thus, embodiments are not limited to any specific combination of hardware circuitry and software.

As stated above, analytics system 222 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling analytics system 222, for driving a device or devices for implementing the process, and for enabling analytics system 222 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

Figure 4:
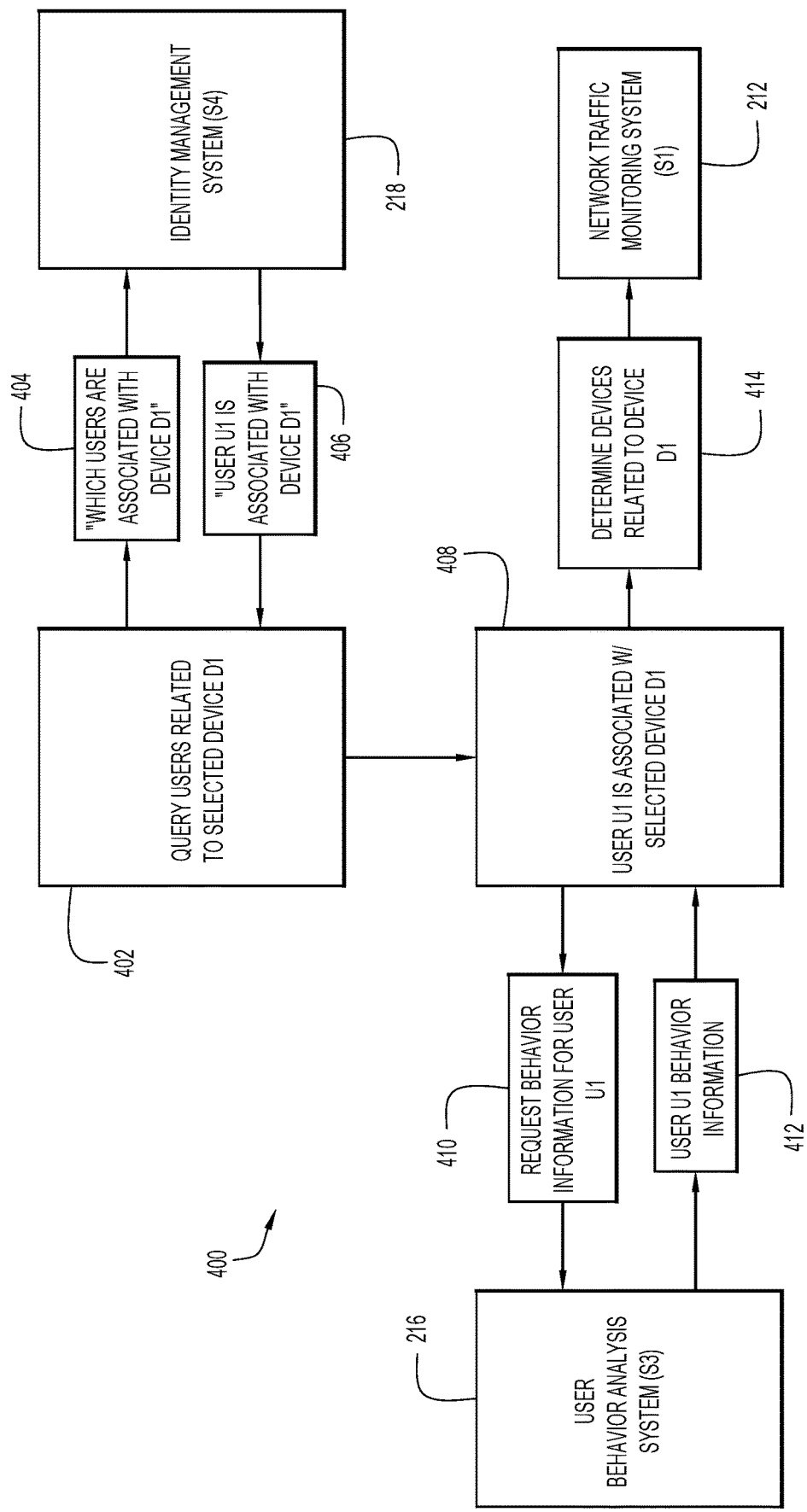
FIG. 4 is a flow diagram illustrating a process to determine related devices in a network via an identity management system and a user behavior analysis system, according to an example embodiment.

FIG. 4 is a flow diagram illustrating a process 400 to determine related devices in network 200 using identity management system 218 and user behavior analysis system 216, according to an example embodiment. In an exemplary embodiment, process 400 begins with an operation 402 where a query is initiated to determine users of a selected device. For example, the selected device may be laptop (D1) 202 as shown in FIG. 2. Next, at an operation 404, a request for the identity of users of the selected device is sent to identity management system 218. Identity management system 218 generates a response, for example, by accessing stored data that associates devices on network 200 with users of those devices. At an operation 406, identity management system 218 responds with a list of users associated (past or present) with the selected device, for example, the identity of a first user (user U1) of the selected device (e.g., laptop 202). In this example, only one user (user U1) is associated with the selected device, however there is no limit to the number of users that could be returned for a given device.

Next, at an operation 408, the identity of the user of the selected device is used to further obtain behavior information associated with that user. At an operation 410, behavior information associated with the first user (U1) is requested from user behavior analysis system 216. At an operation 412, user behavior analysis system 216 provides the requested behavior information associated with the first user (U1). The behavior information for the first user may include, for example, a list of other devices in network 200 used by the first user (U1).

Next, at an operation 414, all devices related to the selected device (e.g., laptop (D1) 202) is determined based on the behavior information associated with the first user (i.e., other devices used by the first user) and also based on devices that have directly or indirectly communicated with the selected device, which can be determined using network traffic flow data from network traffic monitoring system 212.

Figure 5:
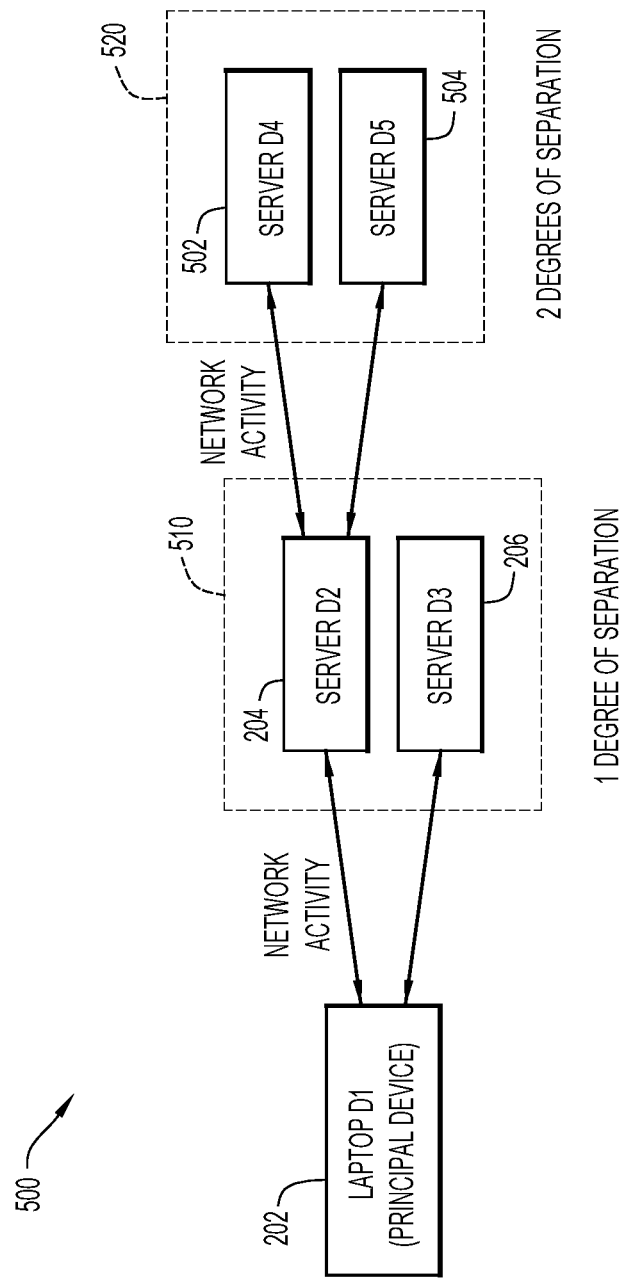
FIG. 5 is a diagram illustrating identifying related devices that are indirectly associated with a selected device, according to an example embodiment.
Figure 6:
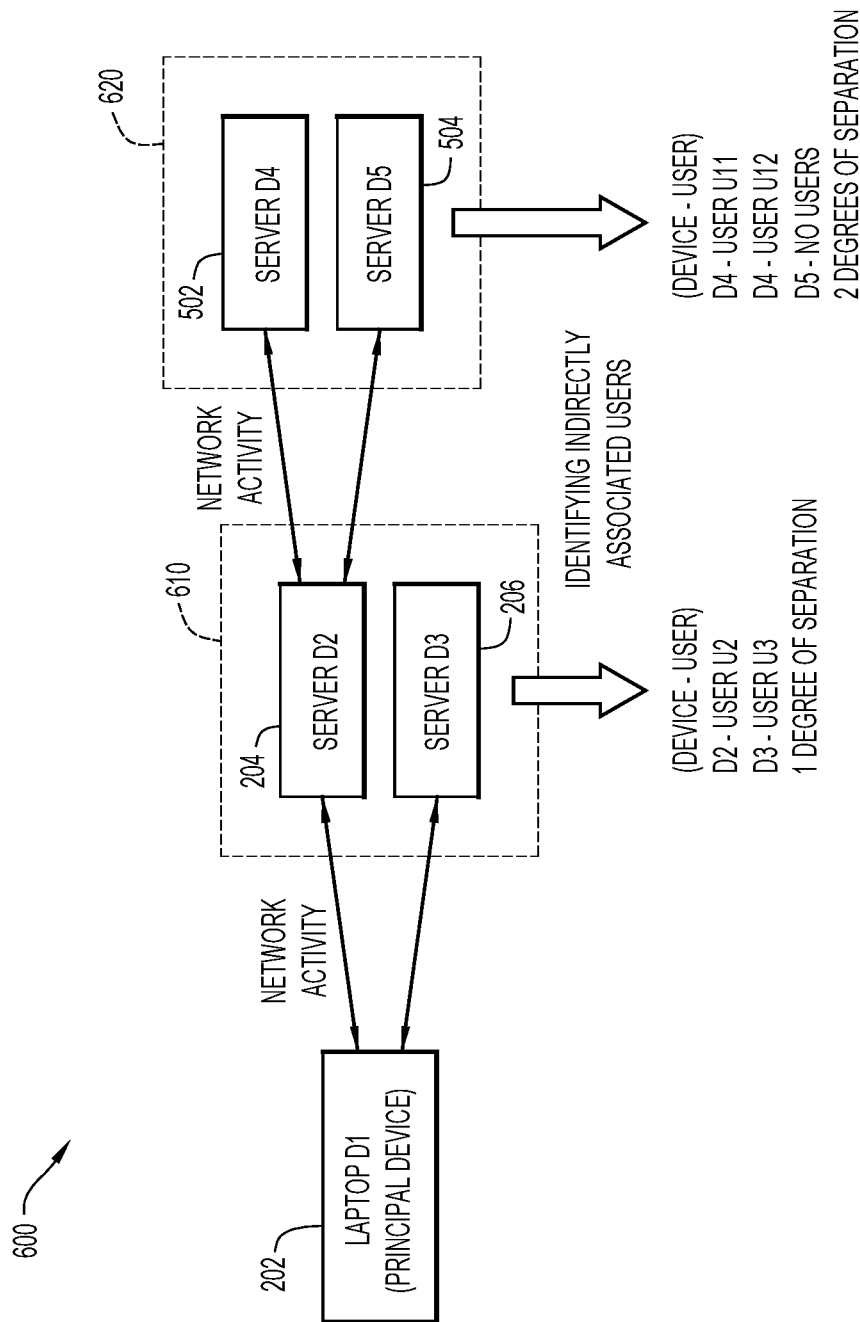
FIG. 6 is a diagram illustrating identifying users of related devices that are indirectly associated with a selected device, according to an example embodiment.

FIGS. 5 and 6 illustrate direct and indirect relationships between users and/or devices in network 200 that may be used to determine whether devices in network 200 are related to a selected device or a specific user. Referring now to FIG. 5, a relationship 500 between laptop (D1) 202 and other devices in network 200 is shown. In this example, network traffic monitoring system 212 may be used to determine which devices have communicated with the selected device (e.g., laptop (D1) 202), as described in FIG. 4. In this example, two devices, first server (D2) 204 and second server (D3) 206 have directly communicated with selected device (e.g., laptop (D1) 202). It should be understood, however, that there is no limit to the number of devices that could be identified as having communicated with the selected device.

In this embodiment, relationship 500 may be expressed in terms of one or more degrees of separation between the selected device (e.g., laptop (D1) 202) and the other directly or indirectly related devices. In this context, a degree of separation comprises a connection with at least one common device or common user (as shown in FIG. 6). Accordingly, in this example, a first group of devices 510, including first server (D2) 204 and second server (D3) 206, have one degree of separation from the selected device (e.g., laptop (D1) 202).

Additionally, a second group of devices 520, including a third server (D4) 502 and a fourth server (D5) 504, have two degrees of separation from the selected device (e.g., laptop (D1) 202). That is, while third server (D4) 502 and fourth server (D5) 504 were not directly in communication with the selected device (e.g., laptop (D1) 202), there were indirectly in communication with the selected device by way of being in communication with first server (D2) 204. According, in this example, third server (D4) 502 and fourth server (D5) 504 have a connection with at least one common device that has a connection with the selected device (e.g., laptop (D1) 202). As a result, third server (D4) 502 and fourth server (D5) 504 may be referred to as being within two degrees of separation for the selected device.

Thus, the diagram of FIG. 5 depicts the concept that indirect associations can extend from other direct and indirect associations, creating associations with one or more degrees of separation from the selected device. This permits dynamic resource implementation prioritization taking into account the additional context of one or more related devices that the selected device communicates with, and other related devices that communicate with those devices, and so on. For example, relationship 500 shown in FIG. 5 extended to two degrees of separation from the selected device (e.g., laptop (D1) 202), however, in other embodiments, additional related devices at three, four, or more degrees of separation may be determined.

FIG. 6 illustrates a relationship 600 between laptop (D1) 202 and users of other devices in network 200. In this example, relationship 600 illustrates related users that are associated with indirectly associated devices of a selected device (e.g., laptop (D1) 202). Related users for indirectly associated devices are identified using the same method as described in connection with FIG. 5, above. For example, as shown in FIG. 6, a first group of devices 610, including first server (D2) 204 and second server (D3) 206, have one degree of separation from the selected device (e.g., laptop (D1) 202) and are associated with a second user (U2) of first server (D2) 204 and a third user (U3) of second server (D3) 206.

Additionally, a second group of devices 620, including third server (D4) 502 and fourth server (D5) 504, have two degrees of separation from the selected device (e.g., laptop (D1) 202) and are associated with a fourth user (U11) and a fifth user (U12) of third server (D4) 502. In this example, no users are associated with fourth server (D5) 504. Understanding indirectly associated users of related devices permits additional actions and analysis to occur for dynamic resource implementation prioritization that is not possible by simply analyzing directly associated users of a selected device. For example, when determining a composite device value, as more described below, values of related devices and/or associated users of related devices may be taken into account. Similarly, when determining a probability factor for a given security vulnerability, an exploit probability of related devices and/or associated users of related devices may also be taken into account. With this arrangement, a selected device that has a direct or indirect association with a particularly vulnerable or high-value related device and/or associated user will have a correspondingly appropriate risk score value that allows an analytics system (e.g., analytics system 222) to prioritize the selected device for resource implementation, such as deploying security measures.

Figure 7:
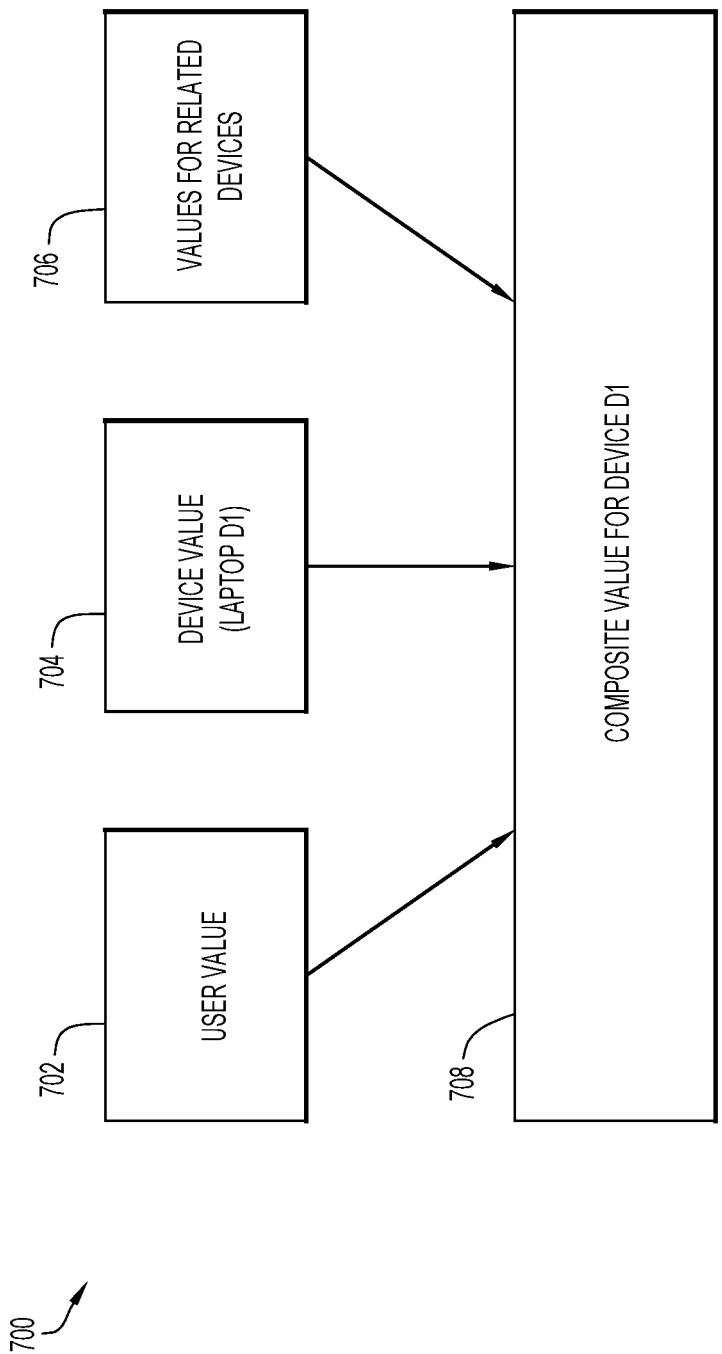
FIG. 7 is a flow diagram illustrating a process to calculate a composite value for a device, according to an example embodiment.

FIG. 7 illustrates a flow diagram of a process 700 to calculate a composite device value 708 for a selected device, according to an example embodiment. In this embodiment, process 700 for calculating composite device value 708 for the selected device (e.g., laptop (D1) 202) includes combining contributions from the user of the device, the selected device, and values of one or more related devices. A user value 702 is associated with a value of the user of the selected device (e.g., laptop (D1) 202). In this example, user value 702 is a value of the first user (U1). In different embodiments, user value may be expressed using various parameters. In some cases, the user value may be expressed as a relative number that proportionally represents the value of one user over other users. For example, in this embodiment, user value 702 may be a decimal number between 0 and 1, where a higher value is represented by a correspondingly higher number closest or equal to 1. In other cases, the user value may be expresses in other terms, including an absolute number based on established criteria, or using monetary values or equivalents.

A device value 704 is associated with the selected device (e.g., laptop (D1) 202). As with user value 702, device value 704 may be expressed in relative or absolute terms. In this example, device value 704 of the selected device (e.g., laptop (D1) 202) may also be a decimal number between 0 and 1. Similarly, values for related devices 706 may be taken into account by process 700. Values for related devices 706 may include one or more related devices associated with the selected device (e.g., laptop (D1) 202) based on direct or indirect relationships to other devices and/or other users, as described by relationships 500, 600 of FIGS. 5 and 6. In addition, in some embodiments, the value of a related device may be based in part on the degrees of separation of the related device and/or associated user from the selected device. Accordingly, a related device that is two degrees of separation (or more) from a selected device may have a smaller value than a related device that is one degree of separation from the selected device.

With this arrangement, values for related devices 706 may be a sum or combination of values according to some other equation or algorithm configured to weigh value contributions from all of the related devices to determine the corresponding value. As with user value 702 and device value 704, values of related devices 706 may also be expressed in relative or absolute terms. In this example, values of related devices 706 may also be expressed as a decimal number between 0 and 1.

Process 700 includes combining the contributions from user value 702, device value 704, and values for related devices 706 to generate composite device value 708 for the selected device (e.g., laptop (D1) 202). The composite device value 708 may then be used by analytics system 222 for dynamic resource implementation prioritization.

Figure 8:
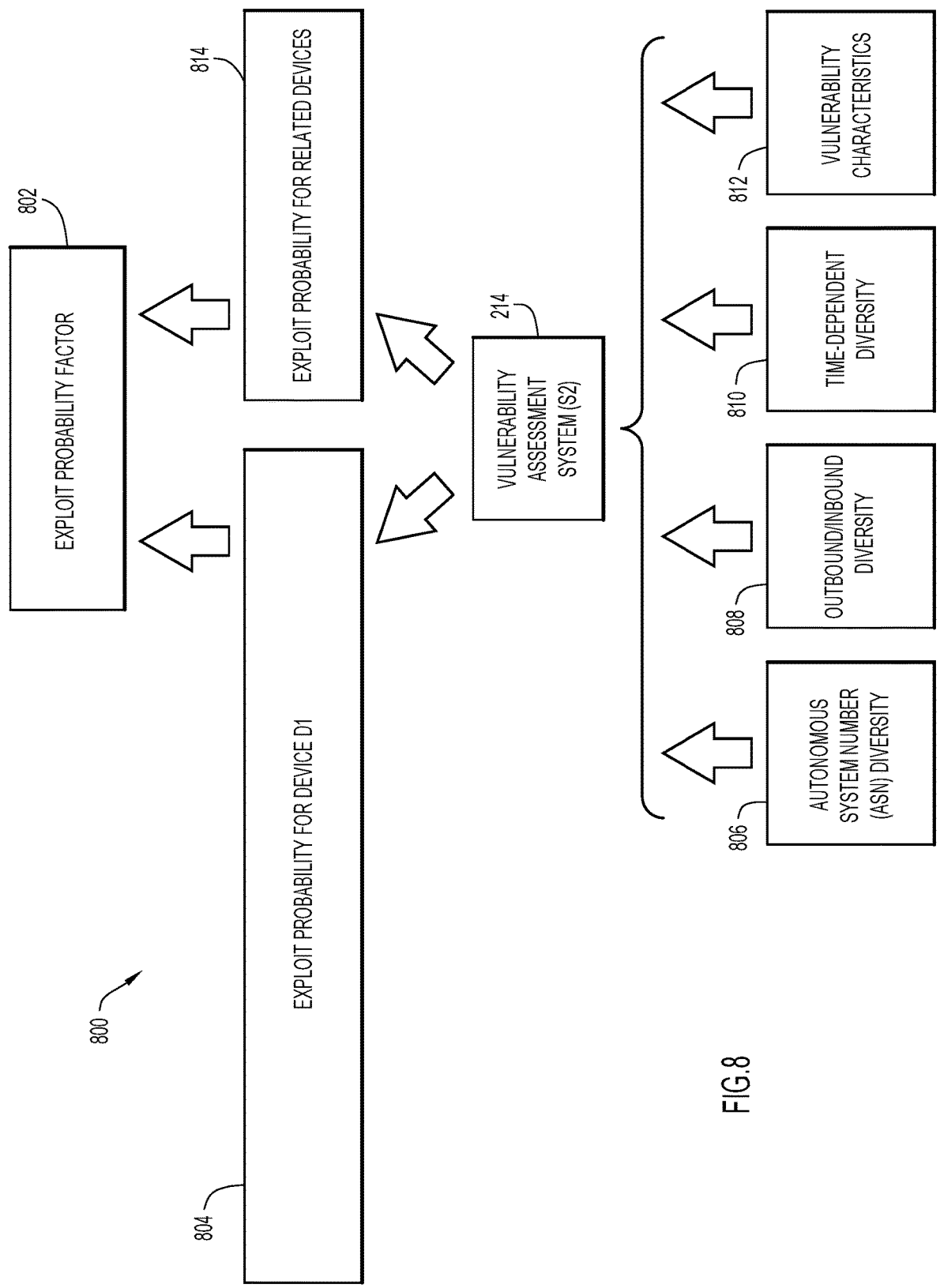
FIG. 8 is a flow diagram illustrating a process to determine a probability factor for a selected device via a vulnerability assessment system, according to an example embodiment.

FIG. 8 illustrates a process 800 to determine an exploit probability factor 802 associated with a given vulnerability for a selected device using vulnerability assessment system 214, according to an example embodiment. Vulnerability assessment system 214 may consider a variety of different approaches to determine an exploit probability 804 for a selected device, for example, laptop (D1) 202. In this embodiment, vulnerability assessment system 214 may consider one or more of autonomous system number (ASN) diversity measures 806, inbound and/or outbound diversity measures 808, time-dependent diversity measures 810, and other vulnerability characteristics 812. Each will be further described below.

ASN Diversity Measures

Autonomous system numbers (ASNs) represent administrative and technical boundaries in a network. Applying ASN diversity measures 806, vulnerability assessment system 214 may be configured to count the number of unique ASNs that communicate inbound to a selected device in network 200 to calculate an ASN diversity score for the selected device.

As an example of ASN diversity measures 806, consider a selected device in network 200 is assigned an Internet Protocol (IP) address 9.9.9.9 and receives inbound connections from entities having IP addresses 1.1.1.1, 2.2.2.2, 3.3.3.3, and 4.4.4.4. In this example, entities with IP addresses 1.1.1.1 and 2.2.2.2 may both belong to a first ASN 100, entity having IP address 3.3.3.3 may belong to a second ASN 200, and entity having IP address 4.4.4.4 may belong to a third ASN 300. Accordingly, in this example, the selected device has received inbound connections from three ASNs (e.g., ASNs 100, 200, and 300). Thus, the ASN inbound diversity score for the selected device is 3, representing the three distinct ASNs from which the selected device has received inbound communications. Additionally, in some scenarios the ASN inbound diversity score may be normalized. In this example, the normalized inbound ASN diversity score for the selected device is $3/(2^{32})$ for 32-bit ASNs, which equals 6.9849193e-10.

In this example, ASN diversity 806 measures have been explained in reference to determining the number of inbound communications to calculate the set of inbound ASNs, and thus the inbound ASN diversity. According to the principles of the example embodiments, ASN diversity measures 806 implemented by vulnerability assessment system 214 may further determine an outbound ASN diversity score. For example, an outbound ASN diversity score may be similarly determined by examining the number of distinct ASNs that a selected device communicates outbound with, based on an analysis of destination IP addresses. A normalized outbound ASN diversity score may be determined, in a similar manner as the normalized inbound diversity score, described above.

With this arrangement, vulnerability assessment system 214 may use ASN diversity measures 806 to determine normalized ASN diversity scores that can be used as an indicator of exploit probability 804 for the selected device. In this scenario, the greater the ASN diversity score, the greater the exploit probability for the selected device.

Inbound Diversity Measures

Inbound diversity is another approach for calculating the probability of a successful exploit of a selected device. Applying inbound diversity measures 808 (similar processes for determining outbound diversity measures 808 are described below), vulnerability assessment system 214 may be configured to examine the network traffic that is being sent to the selected device, specifically the source address of the transmission. Based on this information, vulnerability assessment system 214 can determine the number of unique combinations of source addresses sending communications to the selected device. The number of unique combinations of source addresses is the inbound diversity score for the selected device. The inbound diversity score may further be normalized to a floating point value from 0 to 1 by dividing the inbound diversity score value by the total number of possible combinations.

As an example of inbound diversity measures 808, consider remote entities with IP addresses 1.1.1.1, 2.2.2.2 and 3.3.3.3 that all connect to the selected device with IP address 9.9.9.9. These remote addresses for the entities may be converted into binary form as 00000001000000010000000100000001, 00000010000000100000001000000010, and 00000011000000110000001100000011, respectively. For the selected device with IP address 9.9.9.9 we can calculate that there are 3 distinct remote entities that make inbound connections to the selected device with IP address 9.9.9.9. Accordingly, the inbound diversity score for the selected device is 3, and the normalized inbound diversity score is $3/(2^{32})$=6.9849193e-10.

In the previous example of inbound diversity measures 808, all 32-bits of the IPv4 address were used to compute the diversity. This calculation provides a host- or device-level diversity measurement, a determination of how many unique entities are connecting to the selected device, assuming each entity that establishes a connection has a unique IPv4 address. In another example of inbound diversity measures 808, a network-level diversity measurement may be calculated to determine how many different outside networks establish an inbound connection to the selected device. Network-level diversity may be computed by examining a subset of the remote entity IPv4 address bits. For example, a Class C network is defined by the top (most-significant) 24 bits of the IPv4 address, while the host portion of the address is the remaining lower 8 bits. Following a similar process as described for the inbound diversity score above, a network-level inbound diversity score may be determined by examining only the network bits in the remote addresses.

For example, remote entities with IP addresses 1.1.1.1, 1.1.1.2, 2.2.2.1, 2.2.2.2 all connect inbound to the selected device with IP address 9.9.9.9. These remote entity addresses are converted to binary form as 00000001000000010000000100000001, 00000001000000010000000100000010, 00000010000000100000001000000001, 00000010000000100000001000000010 respectively. The network bits (assuming a 24-bit network prefix) equal 000000010000000100000001, 000000010000000100000001, 000000100000001000000010, 000000100000001000000010, respectively. Of these four remote entity addresses, only two unique 24-bit network prefixes exist, and as such the inbound 24-bit network diversity score is 2. The network-level inbound diversity score may be normalized by dividing by the total possible values ($2^{24}$), to calculate a normalized inbound diversity score of $2/(2^{24})$=1.1920929e-7.

In the above examples, inbound diversity measures 808 include a 32-bit host-level inbound diversity score and a 24-bit network-level inbound diversity score. Both of the scores consider inbound communications to a selected device. The principles of the example embodiments, however, can be applied to an arbitrary number of network or host bits to calculate an N-bit network or host diversity score. For example, with regard to IPv4 addresses, N can be from 1 to 32 bits, and with regard to IPv6 addresses, N can be from 1 to 128 bits.

Examples of inbound/outbound diversity measures 808 described above have examined source addresses for network communications to a selected device to determine an inbound diversity score. Similar measures may also be applied to destination addresses from a selected device to determine an outbound diversity score for inbound/outbound diversity measures 808.

With this arrangement, vulnerability assessment system 214 may use inbound and/or outbound diversity measures 808 to determine normalized inbound diversity scores that can be used as an indicator of exploit probability 804 for the selected device. In this scenario, the greater the inbound diversity score, the greater the exploit probability for the selected device.

Time-Dependent Diversity Measures

ASN diversity measures 806 and inbound/outbound diversity measures 808, described above, calculate diversity scores over an unbounded time window for a given selected device. As a result, the number of source or destination addresses that communicate with (i.e., establish connections to, or receive connections from) a given selected device are determined for as long of a time window as data is available. Not all communications are created equal, however. By applying time-dependent diversity measures 810, vulnerability assessment system 214 may be configured to examine the network behavior of those communications to determine how heavily they weigh on the overall exploit probability for the selected device.

First, time-dependent diversity measures 810 can establish specific time bounds to focus diversity score calculations on nearer-term time windows. For example, over the most recent week, day, or some other defined time period. With this approach, time-dependent diversity measures 810 provide a more temporally-relevant diversity score than using unbound time windows that analyze all of the data over a selected device's past history.

Second, time-dependent diversity measures 810 may also weight different communications differently, depending on network behavior (e.g., bytes transmitted, bytes received, duration of transmission, elapsed time since transmission, etc.).

For example, over a predetermined time period, such as a 12-hour time window, time-dependent diversity measures 810 may be used to calculate a 12-hour inbound 24-bit network diversity score for a selected device with IP address 9.9.9.9 which receives inbound connections from remote entities as follows: a first remote entity with IP address 1.1.1.1 last connected 11 hours ago, a second remote entity with IP address 2.2.2.2 last connected 2 hours ago, and a third remote entity with IP address 3.3.3.3 last connected 1 hour ago. Using a time-decay algorithm proportional to the total time window, each of the communications by the remote entities may be weighted differently to calculate the final diversity score. For example, using the following equation: [1*time_decay(1.1.1.1)+1*time_decay(2.2.2.2)+time_decay(3.3.3.3)]/total possible values]=[1*((12−11)/12)+1*((12−2)/12)+1*((12−1)/12)]/(2^24)=1.09275182e-7=0.000000109275182.

In another example, consider the same selected device and remote entities as in the previous example, however, in this scenario, the temporal proximity is changed. According to this example, the first remote entity with IP address 1.1.1.1 last connected 11 hours ago, the second remote entity with IP address 2.2.2.2 last connected 10 hours ago, and the third remote entity with IP address 3.3.3.3 last connected 9 hour ago. Using the same equation from the previous example, the diversity score may be calculated as follows: [1*time_decay(1.1.1.1)+1*time_decay(2.2.2.2)+time_decay(3.3.3.3)]/total possible values]=[1*((12−11)/12)+1*((12−10)/12)+1*((12−9)/12)]/(2^24)=2.98023224e-8=0.0000000198023224.

The above two examples of time-dependent diversity measures 810 demonstrate time bounding and network-behavior weighting to further improve the usefulness of the resultant diversity score, which may then be used by vulnerability assessment system 214 as an indicator of exploit probability of the selected device. The principles of the embodiments described herein may use any type of network behavior to weight communications in the diversity score calculation.

Vulnerability Characteristics

Using additional vulnerability characteristics 812, vulnerability assessment system 214 may further improve the usefulness of a diversity score by examining metadata associated with a particular vulnerability. For example, a vulnerability A has a Common Vulnerability Scoring System (CVSS) Attack Vector sub-component of N, which indicates that the vulnerability is network-exploitable. Suppose another vulnerability B has a CVSS Attack Vector sub-component of Adjacent, which indicates that the vulnerability is exploitable from the same Layer 2 network. For vulnerability A, vulnerability assessment system 214 may weight network-level diversity scores higher because the vulnerability is network-exploitable. For vulnerability B, vulnerability assessment system 214 may weight network-level diversity scores less, and may weight the diversity scores of devices within the local network more, to establish a more useful diversity score based on vulnerability characteristics 812.

With this arrangement, vulnerability assessment system 214 may consider one or more of ASN diversity measures 806, inbound/outbound diversity measures 808, time-dependent diversity measures 810, and other vulnerability characteristics 812 to determine exploit probability 804 for a selected device, for example, laptop (D1) 202. Additionally, vulnerability assessment system 214 may further apply one or more of ASN diversity measures 806, inbound/outbound diversity measures 808, time-dependent diversity measures 810, and other vulnerability characteristics 812 to each related device, determined, for example, as described in operation 414 of FIG. 4. The combined exploit probability for related devices 814 determined by vulnerability assessment system 214 may be combined with exploit probability 804 for the selected device to calculate exploit probability factor 802. Exploit probability factor 802 represents the likelihood of a successful exploit of the selected device based on considerations of various exploit probability measures, described above, for not only the selected device, but also for one or more related devices to the selected device.

Figure 9:
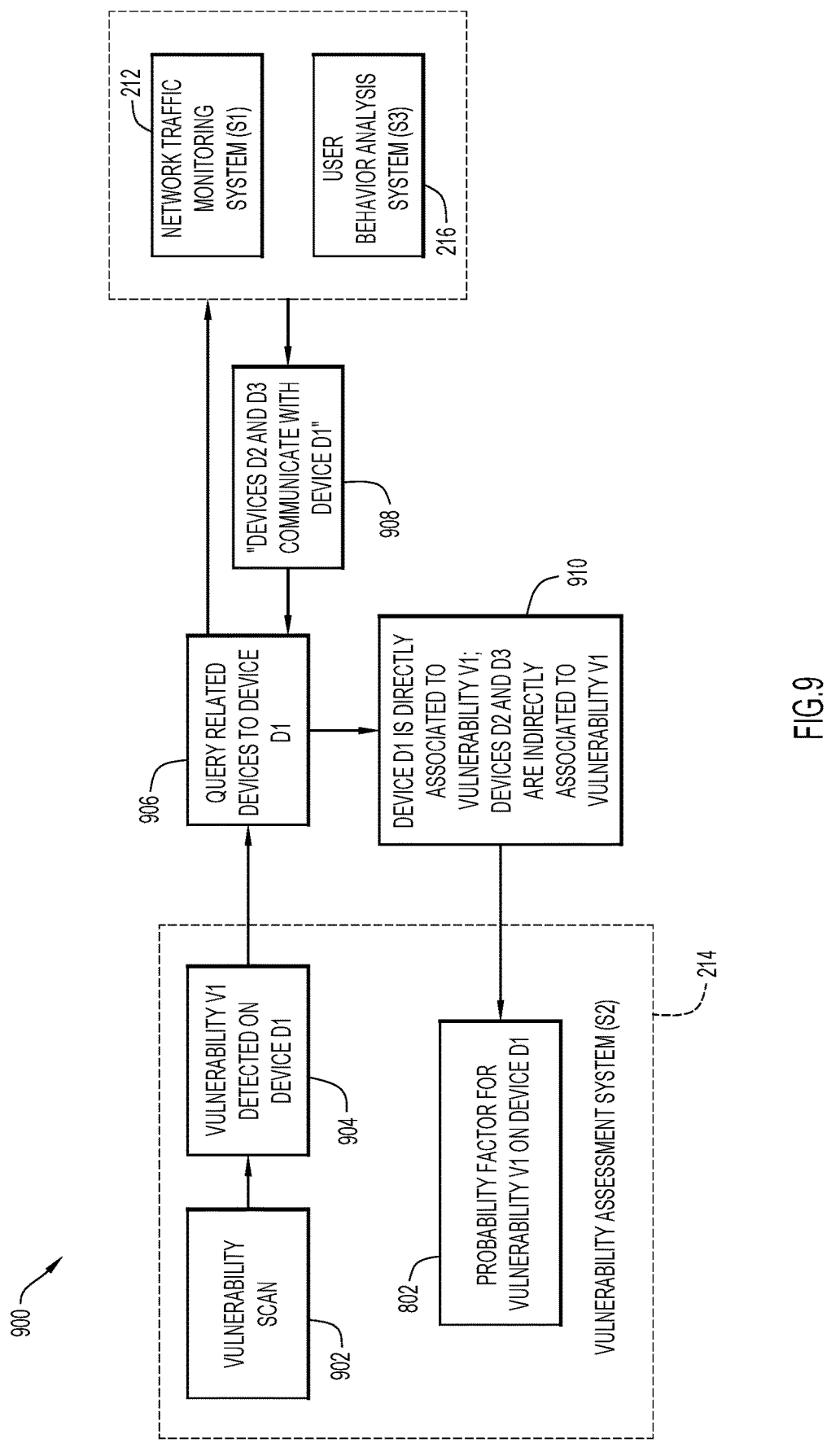
FIG. 9 is a flow diagram illustrating a process implemented by a vulnerability assessment system to associate devices to vulnerabilities using information from a network traffic monitoring system and a user behavior analysis system, according to an example embodiment.

FIG. 9 illustrates a logical/function diagram of a process 900 implemented by vulnerability assessment system 214 to determine a probability factor for a particular vulnerability on a selected device using information from network traffic monitoring system 212 and user behavior analysis system 216, according to an example embodiment. For example, process 900 of determining a probability factor for a particular vulnerability (V1) on a selected device (e.g., laptop (D1)) may include one or more steps of process 800, described above, to determine exploit probabilities for the selected device and one or more related devices.

In this embodiment, process 900 may begin at an operation 902 where vulnerability assessment system 214 performs a vulnerability scan of one or more devices on a network, for example, scanning one or more of devices 202, 204, 206, 208 on network 200 as shown in FIG. 2. Next, at an operation 904, vulnerability assessment system 214 has detected a particular vulnerability (e.g. vulnerability V1) on a selected device (e.g., laptop (D1) 202). At an operation 906, devices related to the selected device are determined. Devices that are related to the selected device may be determined based on information from network traffic monitoring system 212 and/or user behavior analysis system 216, for example, as described above with reference to FIGS. 4-6.

At an operation 908, one or more related devices are identified. In this example, the related devices include first server (D2) 204 and second server (D3) 206. Next, at an operation 910, information about the selected device (e.g. laptop (D1) 202) and the related devices (e.g., first server (D2) 204 and second server (D3) 206) are provided to vulnerability assessment system 214. Using process 800, described above, vulnerability assessment system 214 may determine the relevant exploit probabilities for the selected device and the related devices to calculate the overall exploit probability factor 802 for the particular vulnerability (e.g. vulnerability V1) on the selected device (e.g., laptop (D1) 202).

Figure 10:
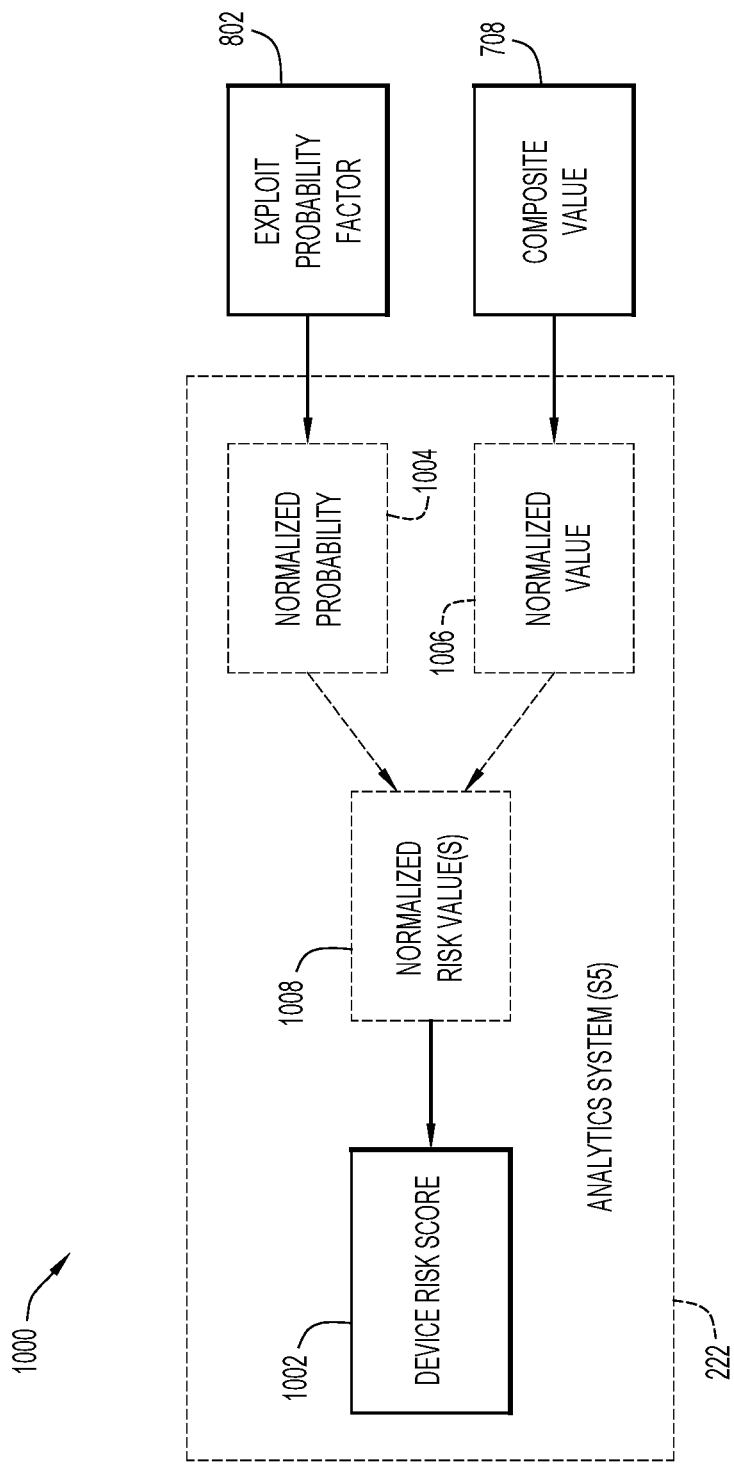
FIG. 10 is a flow diagram illustrating a process implemented by an analytics system to calculate a risk score for a device, according to an example embodiment.

Referring now to FIG. 10, a process 1000 is shown for calculating a risk score for a device, according to an example embodiment. In this embodiment, process 1000 may include consideration of two previously determined values. The first value considered is the composite device value 708, which may have been calculated for a selected device according to process 700 described above with reference to FIG. 7. The second value considered is the exploit probability factor 802, which may have been calculated for a selected device according to process 800 described above with reference to FIG. 8.

In an example embodiment, risk score 1002 may be calculated by analytics system 222, which uses composite device value 708 and exploit probability factor 802 as inputs of process 1000. Analytics system 222 may determine risk score 1002 for a selected device by multiplying the composite device value 708 by the exploit probability factor 802. With this arrangement, risk score 1002 for the selected device is calculated.

Additionally, analytics system 222 may optionally normalize each of composite device value 708 and exploit probability factor 802. For example, at an operation 1004, exploit probability factor 802 may be normalized and, at an operation 1006, composite device value 709 may also be normalized. Analytics system 222 may calculate a plurality of risk scores from a plurality of calculations of composite device values and exploit probability factors. Taken together, the plurality of risk scores may be used to provide normalized risk score 1008.

Figure 11:
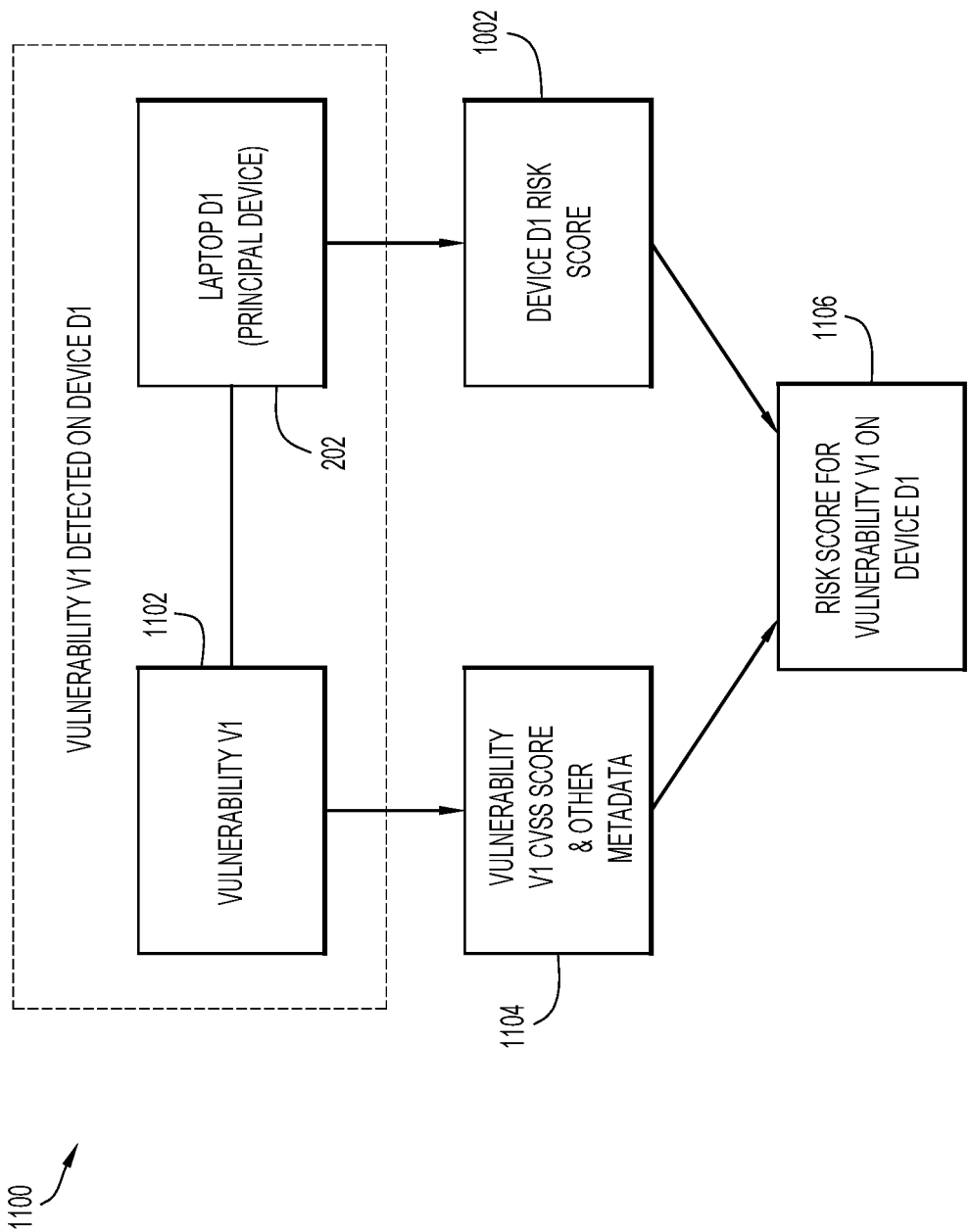
FIG. 11 is a diagram illustrating a process for calculating a risk score for a specific vulnerability on a specific device, according to an example embodiment.

FIG. 11 illustrates a process 1100 for calculating a risk score for a specific vulnerability 1102 (e.g., vulnerability V1) on a selected device (e.g., laptop (D1) 202) according to the principles of the example embodiments described herein. In this embodiment, process 1100 includes calculating the risk score 1002 for the selected device (e.g., laptop (D1) 202), as described above with reference to FIG. 10. Process 1100 may also include obtaining vulnerability metadata 1104 (e.g., CVSS Score) that may be extracted from relevant data sources, such as from a Vulnerability Management Service (VMS), public sources, or other source.

In this embodiment, the vulnerability metadata 1104 (e.g., CVSS Score) is normalized and incorporated into the selected device's risk score 1106, which may be calculated as explained above with reference to FIGS. 8-10. Process 1100 may be repeated separately for each vulnerability on each selected device. In other words, one vulnerability may not impact the resultant risk score for other vulnerabilities on that same device.

Additionally, in some cases, probability factors derived from the vulnerability itself (e.g., a CVSS score, as used in the above example) may be incorporated directly into the selected device's risk score. This arrangement permits a single risk score for the selected device which considers all vulnerabilities present on the device.

Figure 12:
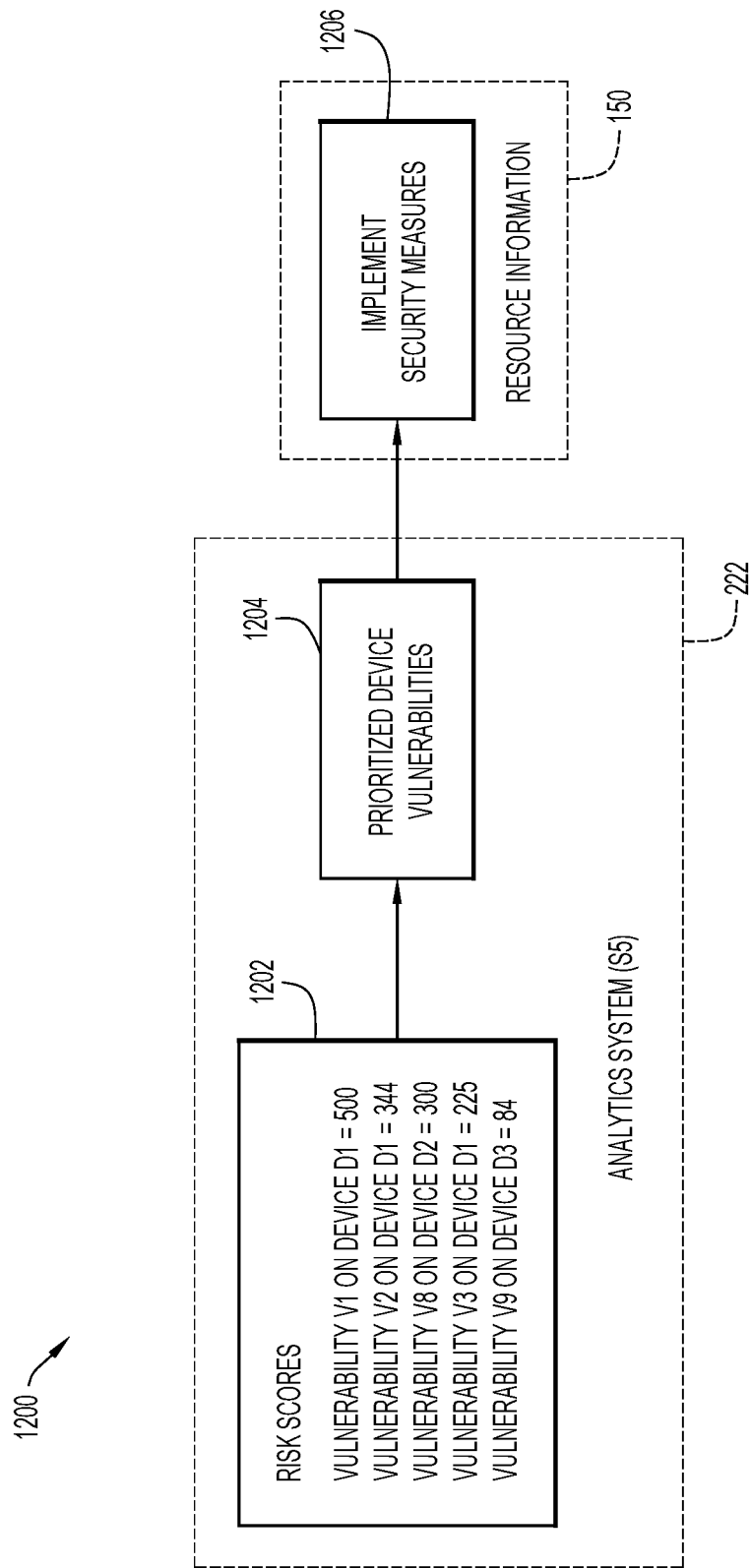
FIG. 12 is a diagram illustrating a representation of a plurality of risk score values in a prioritized list format for resource implementation prioritization, according to an example embodiment.

Referring now to FIG. 12, a process 1200 illustrating a representation of a plurality of risk score values in a prioritized list format for resource implementation prioritization is shown according to an example embodiment. In an example embodiment, analytics system 222 may use the principles of the example embodiments described herein to calculate a plurality of risk score values 1202. The plurality of risk score values 1202 may represent risk scores for one or more different selected device, one or more different particular vulnerabilities, and combinations of selected devices and particular vulnerabilities. For example, in this embodiment, plurality of risk score values 1202 include a first risk score for a first vulnerability on a first device (e.g., vulnerability V1 on laptop (D1) 202 having risk score 500), a second risk score for a second vulnerability on the first device (e.g., vulnerability V2 on laptop (D1) 202 having risk score 344), a third risk score for a third vulnerability on a second device (e.g., vulnerability V8 on first server (D2) 204 having risk score 300), a fourth risk score for a fourth vulnerability on the first device (e.g., vulnerability V3 on laptop (D1) 202 having risk score 225), and a fifth risk score for a fifth vulnerability on a third device (e.g., vulnerability V9 on second server (D3) 206 having risk score 84).

At an operation 1204, plurality of risk score values 1202 may be prioritized based on the severity of the risk to the network. For example, in this embodiment, a more severe risk is represented by a higher risk score value. Accordingly, the first risk score for the first vulnerability on the first device (e.g., vulnerability V1 on laptop (D1) 202 having risk score 500) has the highest risk score, and, therefore, is the most severe risk affecting network 200. As a result, at an operation 1206, resource implementation function 150 may implement security measures in a way to prioritize the first vulnerability on the first device (e.g., vulnerability V1 on laptop (D1) 202). Each vulnerability on each device represented by plurality of risk score values 1202 may be similarly prioritized in a relative manner by resource implementation function 150 at operation 1206.

According to the principles of the example embodiments, resource implementation function 150 may implement security measures at operation 1206 as a dynamic resource implementation prioritization based on the relative risk score values. In some embodiments, implementing security measures may include one or more of directing or re-directing preventative security resources (e.g., ensuring patched systems, ensuring properly configured systems, ensuring no vulnerabilities on the system, etc.) and directing or re-directing reactive security resources (e.g., responding to security threats, responding to security exploits, responding to compromised systems, etc.). In other embodiments, dynamic resource implementation prioritization may further include one or more of directing or re-directing monitoring resources (e.g., network data loss prevention (DLP), event monitoring, general system health monitoring, security monitoring, etc.) and providing input to other analytics systems (e.g., security information and event management (STEM), User and Entity Behavior Analytics (UEBA), Posture Assessment products, etc.).

Figure 13:
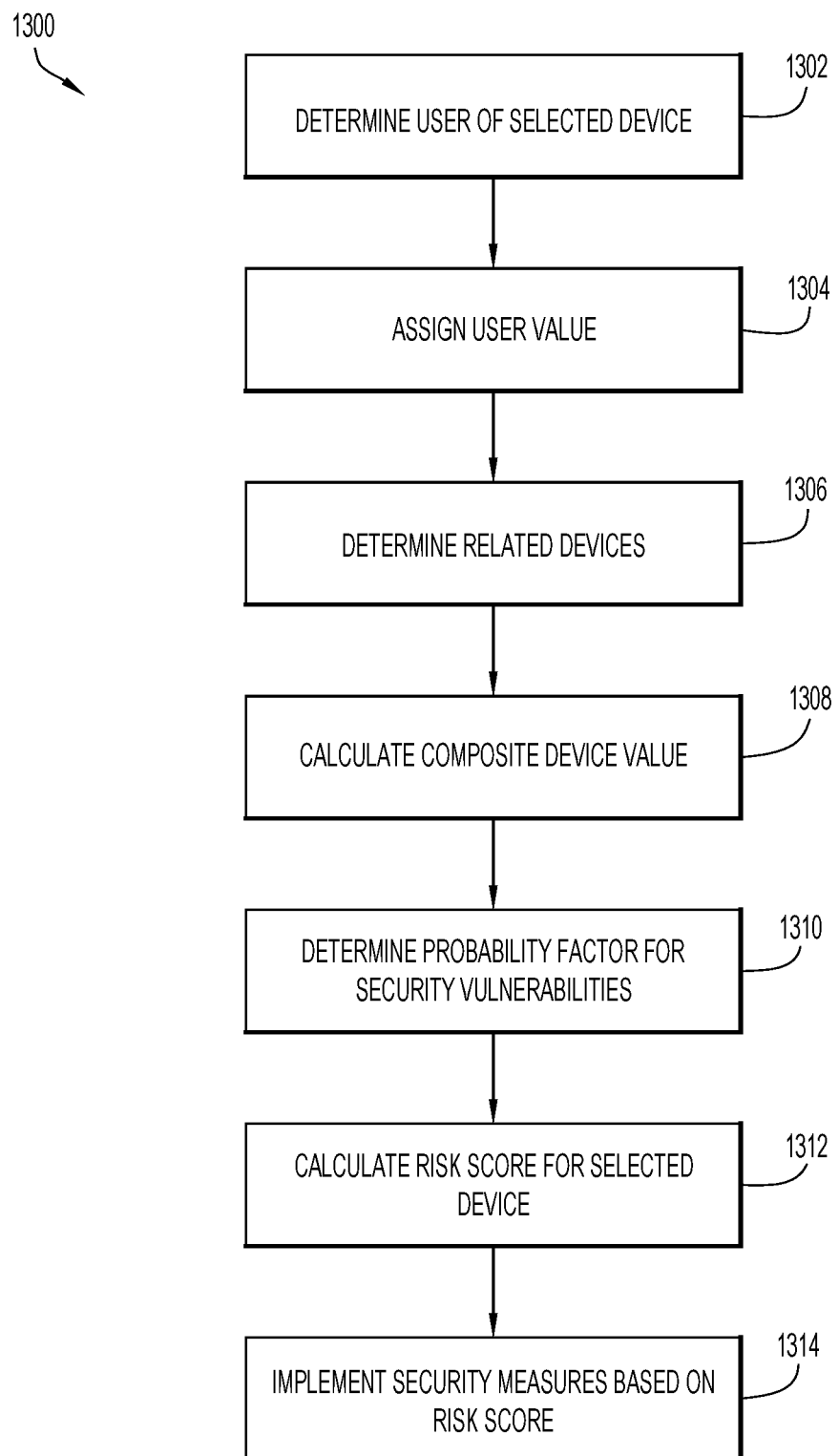
FIG. 13 is a flow diagram illustrating a method for resource implementation prioritization, according to an example embodiment.

FIG. 13 is a flow diagram illustrating method 1300 for resource implementation prioritization, according to an example embodiment. Method 1300 may be explained with reference to FIGS. 1-12 above. At an operation 1302, a user of a selected device in a network is determined. For example, user (U1) of laptop (D1) 202, described above. Next, at an operation 1304, a user value is assigned to the user. In an example embodiment, the user value may be based on an identity of the user obtained from an identity management system (e.g., identity management system (S4) 218).

At an operation 1306, one or more related devices on the network are determined. For example, as described above related devices may be associated with the user by evaluating behavior information of the user to identify devices in the network that are in communication with the selected device. Related devices associated with the selected device (e.g., laptop (D1) 202) may be based on direct or indirect relationships to other devices and/or other users, as described by relationships 500, 600 of FIGS. 5 and 6.

Next, at an operation 1308, a composite device value for the selected device is calculated. The composite device value may be based on: (i) a value of the selected device, (ii) the user value, and (iii) values of the one or more related devices. For example, as described with reference to composite device value 708 for laptop (D1) 202. In addition, in some embodiments, the value of a related device may be based in part on the degrees of separation of the related device and/or associated user from the selected device. Accordingly, a related device that is two degrees of separation (or more) from a selected device may have a smaller value than a related device that is one degree of separation from the selected device.

Next, at an operation 1310, a probability factor associated with potential security vulnerabilities affecting the selected device is determined. For example, operation 1310 may include determining probably factor 802 for laptop (D1) 202, as described above with reference to FIGS. 8 and 9.

At an operation 1312, a risk score is calculated for the selected device based on the composite device value and the probability factor. For example, device risk score 1002 for laptop (D1) 202, as described above with reference to FIGS. 10 and 11.

In an example embodiment, method 1300 may include an operation 1314, where security measures in the network are implemented based on a comparison of the calculated risk score for the selected device with a plurality of risk scores for other devices in the network. For example, operation 1314 may be implemented as described above with reference to FIG. 12. Additionally, in other embodiments, operation 1314 may include dynamic resource implementation prioritization based on the relative risk score values to take other measures, as described above in reference to FIG. 12.

According to the techniques described above, network risk (indicators of threat activity from Cisco Systems' threat portfolio, such as the Stealthwatch Concern Index score, or network traffic flow records that indicate external entities have unfettered inbound access to a device) can be used in the same way as described above to propagate network-centric device risk onto vulnerabilities for improved prioritization that more accurately accounts for business risk.

Example Customer-Validated Use Cases (1) Devices that serve more sensitive users in the organization can be prioritized higher for remediation when a vulnerability is detected (sensitivity of users is based upon the user value, as determined by the user behavior analysis); this example could prioritize devices that serve users with access to financial forecasting applications, executives based on organizational position, or Active Directory® (AD) administrators.

(2) Devices that serve a greater number of users in an organization can be prioritized higher for remediation when a vulnerability is detected (as detected by a combination of user behavior analytics data and Stealthwatch data); this example could prioritize Exchange® servers, AD servers, Single Sign-On (SSO) servers, and other enterprise-wide services ahead of a developer's web server, without the need for an IT analyst to manually tag those enterprise-wide services.

(3) Devices that serve unsolicited external requests (e.g., internet-facing services) can be prioritized higher for remediation when a vulnerability is detected (as detected by Stealthwatch records indicating unsolicited inbound flows); this example could prioritize Extranet/Datacenter servers over servers that are isolated at Layer 2 or have adequate inbound Access Control Lists (ACLs) in place.

In summary, presented herein are methods for dynamically prioritizing network and computer security vulnerabilities based upon incorporating user and network risk during vulnerability prioritization processes.

In summary, a method is provided comprising: determining, for a selected device in a network, at least one user of the selected device; assigning a user value to the at least one user, wherein the user value is based on an identity of the at least one user; determining one or more related devices on the network associated with the at least one user by evaluating behavior information of the at least one user to identify devices in the network that are in communication with the selected device; calculating a composite device value for the selected device based on: (i) a value of the selected device, (ii) the user value, and (iii) values of the one or more related devices; determining, for the selected device, a probability factor associated with potential security vulnerabilities affecting the selected device; calculating a risk score for the selected device based on the composite device value and the probability factor; and implementing security measures in the network based on a comparison of the calculated risk score for the selected device with a plurality of risk scores for other devices in the network.

In another form, one or more non-transitory computer readable storage media encoded with instructions that, when executed by a processor, cause the processor to perform operations comprising: determining, for a selected device in a network, at least one user of the selected device; assigning a user value to the at least one user, wherein the user value is based on an identity of the at least one user; determining one or more related devices on the network associated with the at least one user by evaluating behavior information of the at least one user to identify devices in the network that are in communication with the selected device; calculating a composite device value for the selected device based on: (i) a value of the selected device, (ii) the user value, and (iii) values of the one or more related devices; determining, for the selected device, a probability factor associated with potential security vulnerabilities affecting the selected device; calculating a risk score for the selected device based on the composite device value and the probability factor; and implementing security measures in the network based on a comparison of the calculated risk score for the selected device with a plurality of risk scores for other devices in the network.

In addition, an apparatus is provided comprising: a communication interface configured to enable network communications with a plurality of devices in a network; and a processor coupled with the communication interface, and configured to: determine, for a selected device in the network, at least one user of the selected device; assign a user value to the at least one user, wherein the user value is based on an identity of the at least one user; determine one or more related devices on the network associated with the at least one user by evaluating behavior information of the at least one user to identify devices in the network that are in communication with the selected device; calculate a composite device value for the selected device based on: (i) a value of the selected device, (ii) the user value, and (iii) values of the one or more related devices; determine, for the selected device, a probability factor associated with potential security vulnerabilities affecting the selected device; calculate a risk score for the selected device based on the composite device value and the probability factor; and implement security measures in the network based on a comparison of the calculated risk score for the selected device with a plurality of risk scores for other devices in the network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
    determining, for a selected device in a network, at least one user of the selected device;
    assigning a user value to the at least one user, wherein the user value is based on an identity of the at least one user;
    obtaining behavior information of the at least one user, the behavior information including a list of other devices in the network used by the at least one user;
    determining one or more related devices on the network associated with the at least one user by evaluating the behavior information of the at least one user and identifying devices in the network that are in communication with the selected device;
    calculating a composite device value for the selected device by combining contributions from: (i) a value of the selected device that is based on direct or indirect relationships to the devices in the network that are in communication with the selected device, (ii) the user value, and (iii) values of the one or more related devices;
    determining, for the selected device, a probability factor associated with potential security vulnerabilities affecting the selected device;
    calculating a risk score for the selected device based on the composite device value and the probability factor; and
    implementing security measures in the network based on a comparison of the risk score for the selected device with a plurality of risk scores for other devices in the network.

2. The method of claim 1, further comprising:
    determining a dynamic resource implementation prioritization based on the comparison of the risk score for the selected device with the plurality of risk scores for the other devices in the network, wherein the implementing is based on the dynamic resource implementation prioritization.

3. The method of claim 1, wherein the behavior information of the at least one user comprises network traffic flow data.

4. The method of claim 1, wherein the one or more related devices associated with the at least one user include indirectly associated devices that have at least one degree of separation from the selected device, wherein a degree of separation comprises a connection with at least one common device or common user.

5. The method of claim 4, wherein the indirectly associated devices include a first group of devices having one degree of separation from the selected device and a second group of devices having two degrees of separation from the selected device.

6. The method of claim 5, wherein a value for an indirectly associated device of the first group of devices is larger than a value for an indirectly associated device of the second group of devices.

7. The method of claim 1, wherein determining the probability factor associated with potential security vulnerabilities affecting the selected device includes calculating an exploit probability for the selected device.

8. The method of claim 7, wherein the probability factor is based on: (i) the exploit probability of the selected device, and (ii) exploit probabilities of the one or more related devices.

9. The method of claim 1, further comprising calculating a plurality of risk scores for the selected device, wherein each of the plurality of risk scores is determined based on a different potential security vulnerability affecting the selected device.

10. A non-transitory computer readable storage media encoded with instructions that, when executed by a processor, cause the processor to perform operations comprising:
    determining, for a selected device in a network, at least one user of the selected device;
    assigning a user value to the at least one user, wherein the user value is based on an identity of the at least one user;
    obtaining behavior information of the at least one user, the behavior information including a list of other devices in the network used by the at least one user;
    determining one or more related devices on the network associated with the at least one user by evaluating the behavior information of the at least one user and identifying to identify devices in the network that are in communication with the selected device;
    calculating a composite device value for the selected device by combining contributions from: (i) a value of the selected device that is based on direct or indirect relationships to the devices in the network that are in communication with the selected device, (ii) the user value, and (iii) values of the one or more related devices;
    determining, for the selected device, a probability factor associated with potential security vulnerabilities affecting the selected device;
    calculating a risk score for the selected device based on the composite device value and the probability factor; and
    implementing security measures in the network based on a comparison of the risk score for the selected device with a plurality of risk scores for other devices in the network.

11. The non-transitory computer readable storage media of claim 10, wherein the implementing is based on a dynamic resource implementation prioritization that is determined based on the comparison of the risk score for the selected device with the plurality of risk scores for the other devices in the network.

12. The non-transitory computer readable storage media of claim 10, wherein the behavior information of the at least one user comprises network traffic flow data.

13. The non-transitory computer readable storage media of claim 10, wherein the one or more related devices associated with the at least one user include indirectly associated devices, including a first group of devices having one degree of separation from the selected device and a second group of devices having two degrees of separation from the selected device, wherein a degree of separation comprises a connection with at least one common device or common user.

14. The non-transitory computer readable storage media of claim 10, wherein determining the probability factor associated with potential security vulnerabilities affecting the selected device includes calculating an exploit probability for the selected device.

15. The non-transitory computer readable storage media of claim 14, wherein the probability factor is based on: (i) the exploit probability of the selected device, and (ii) exploit probabilities of the one or more related devices.

16. An apparatus comprising:
a hardware communication interface configured to enable network communications with a plurality of devices in a network; and
a hardware processor coupled with the hardware communication interface, and configured to:
determine, for a selected device in the network, at least one user of the selected device;
assign a user value to the at least one user, wherein the user value is based on an identity of the at least one user;
obtain behavior information of the at least one user, the behavior information including a list of other devices in the network used by the at least one user;
determine one or more related devices on the network associated with the at least one user by evaluating the behavior information of the at least one user and identifying devices in the network that are in communication with the selected device;
calculate a composite device value for the selected device by combining contributions from: (i) a value of the selected device that is based on direct or indirect relationships to the devices in the network that are in communication with the selected device, (ii) the user value, and (iii) values of the one or more related devices;
determine, for the selected device, a probability factor associated with potential security vulnerabilities affecting the selected device;
calculate a risk score for the selected device based on the composite device value and the probability factor; and
implement security measures in the network based on a comparison of the risk score for the selected device with a plurality of risk scores for other devices in the network.

17. The apparatus of claim 16, wherein an implementation of security measures is based on a dynamic resource implementation prioritization that is determined based on the comparison of the risk score for the selected device with the plurality of risk scores for the other devices in the network.

18. The apparatus of claim 16, wherein the one or more related devices associated with the at least one user include indirectly associated devices, including a first group of devices having one degree of separation from the selected device and a second group of devices having two degrees of separation from the selected device, wherein a degree of separation comprises a connection with at least one common device or common user.

19. The apparatus of claim 16, wherein determining the probability factor associated with potential security vulnerabilities affecting the selected device includes calculating an exploit probability for the selected device.

20. The apparatus of claim 19, wherein the probability factor is based on: (i) the exploit probability of the selected device, and (ii) exploit probabilities of the one or more related devices.

* * * * *

UNITED STATES PATENT AND TRADEMARK OFFICE
CERTIFICATE OF CORRECTION

| | |
|---|---|
| PATENT NO. | : 11,706,240 B2 |
| APPLICATION NO. | : 17/068383 |
| DATED | : July 18, 2023 |
| INVENTOR(S) | : Travis Sugarbaker |

It is certified that error appears in the above-identified patent and that said Letters Patent is hereby corrected as shown below:

In the Claims

Claim 10, Column 18, Line 29, please replace "identifying to identify devices in the network" with --identifying devices in the network--

Signed and Sealed this
Seventh Day of November, 2023

Katherine Kelly Vidal
*Director of the United States Patent and Trademark Office*